United States Patent [19]

Bell

[11] Patent Number: 4,587,650

[45] Date of Patent: May 6, 1986

[54] METHOD OF SIMULTANEOUSLY TRANSMITTING ISOCHRONOUS AND NONISOCHRONOUS DATA ON A LOCAL AREA NETWORK

[75] Inventor: John L. Bell, Escondido, Calif.

[73] Assignee: Burroughs Corporation, Detroit, Mich.

[21] Appl. No.: 666,474

[22] Filed: Oct. 30, 1984

[51] Int. Cl.$^4$ .............................................. H04J 3/00
[52] U.S. Cl. ........................................ 370/86; 370/89
[58] Field of Search ............... 370/86, 89; 340/825.05

[56] References Cited

U.S. PATENT DOCUMENTS

| | | | |
|---|---|---|---|
| 4,154,983 | 5/1979 | Pedersen | 370/89 |
| 4,251,880 | 2/1981 | Baugh et al. | 370/89 |
| 4,383,315 | 5/1983 | Torng | 370/89 |
| 4,445,116 | 4/1984 | Grow | 370/89 |
| 4,459,588 | 7/1984 | Grow | 370/89 |
| 4,482,999 | 11/1984 | Janson et al. | 370/89 |
| 4,538,147 | 8/1985 | Grow | 370/89 |
| 4,549,291 | 10/1985 | Renoulin et al. | 370/89 |
| 4,549,292 | 10/1985 | Isaman et al. | 370/89 |
| 4,553,234 | 11/1985 | Brandsma et al. | 370/89 |

Primary Examiner—Douglas W. Olms
Assistant Examiner—Kenneth I. Rokoff
Attorney, Agent, or Firm—Charles J. Fassbender; Kevin R. Peterson

[57] ABSTRACT

A method of simultaneously transmitting both isochronous and nonisochronous data on a local area network includes the steps of: circulating around the network, a first unique signal pattern and at least one occurrence of a second unique signal pattern with a constant time interval between each unique signal pattern and the next one; writing nonisochronous data onto the network from any station and subsequently removing the same in response to a counter that is synchronized to the first unique signal pattern; and simultaneously, writing isochronous data onto the network from any station in response to a counter that is synchronized to each occurrence of the first and second signal patterns.

12 Claims, 3 Drawing Figures

METHOD OF SIMULTANEOUSLY TRANSMITTING ISOCHRONOUS AND NONISOCHRONOUS DATA ON A LOCAL AREA NETWORK

BACKGROUND OF THE INVENTION

This invention relates to electronic communication; and more particularly, it relates to methods and apparatus for simultaneously transmitting isochronous and nonisochronous data on a local area network.

A local area network includes a plurality of stations each of which has an input port and an output port. These stations are intercoupled as one or more loops in which the output part of each station couples to the input port of the next station. If more than one loop exists in the network, then the loops are intercoupled in pairs by one or more bridge stations.

Isochronous data is data which is transmitted in parts by a station on the network at fixed periodic intervals. A station which every 125 microseconds, transmits one byte of data in 0.16 microseconds, is transmitting isochronously. Such a transmission occurs, for example, when voice samples of a telephone conversation are being transmitted.

Nonisochronous data is data which is transmitted all at once in a block. For example, a station that transmits 70 bytes of data one time as a contiguous block of bytes is transmitting nonisochronously. Such a transmission occurs, for example, when a record or file is being sent from one station to another.

One important parameter of a local area network is the amount of time that it takes for data to pass from the input port of a station to the output port. Preferably, this delay is short because certain types of isochronous data (e.g., telephone voice samples) must make the round trip through all the stations of a local area network loop within an upper time limit. Thus, as the per station delay gets shorter, the total number of stations on the loop can increase.

Another important parameter of a local area network is the amount of circuitry that each station is required to have in order to transmit isochronous and nonisochronous data in the network. Preferably, this circuitry is minimal so the cost of adding a station is low.

Both the delay through a station and amount of circuitry that a station is required to have to transmit on the network are dependent upon the method by which data is sent on the network. Accordingly, a primary object of the invention is to provide an improved method of simultaneously transmitting isochronous and nonisochronous data on a local area network which reduces delay through and circuitry in stations on the network.

BRIEF SUMMARY OF THE INVENTION

This object, and others, are achieved in accordance with the present invention by a method in which isochronous and nonisochronous data are simultaneously transmitted by the steps of:
circulating around a local area network loop, a first unique signal pattern and at least one occurrence of a second unique signal pattern with a constant time interval between each unique signal pattern and the next one;
counting at a fixed rate in one station on the loop, starting with the receipt of the first unique signal pattern;
writing nonisochronous data onto the loop and storing a signal in the one station representative of the count when the writing occurred;
recounting at the fixed rate in the one station beginning with the next receipt of the first unique signal pattern;
sending onto the loop, when the recount matches the count represented by the stored signal, a control code indicating that the nonisochronous data can be removed; and simultaneous with the above steps,
writing isochronous data from another station at a predetermined time interval immediately after the receipt of each of the unique signal patterns.

BRIEF DESCRIPTION OF THE DRAWINGS

Various features and advantages of the invention are described in the Detailed Description in conjunction with the accompanying drawings wherein.

DETAILED DESCRIPTION OF THE INVENTION

Figure 1:
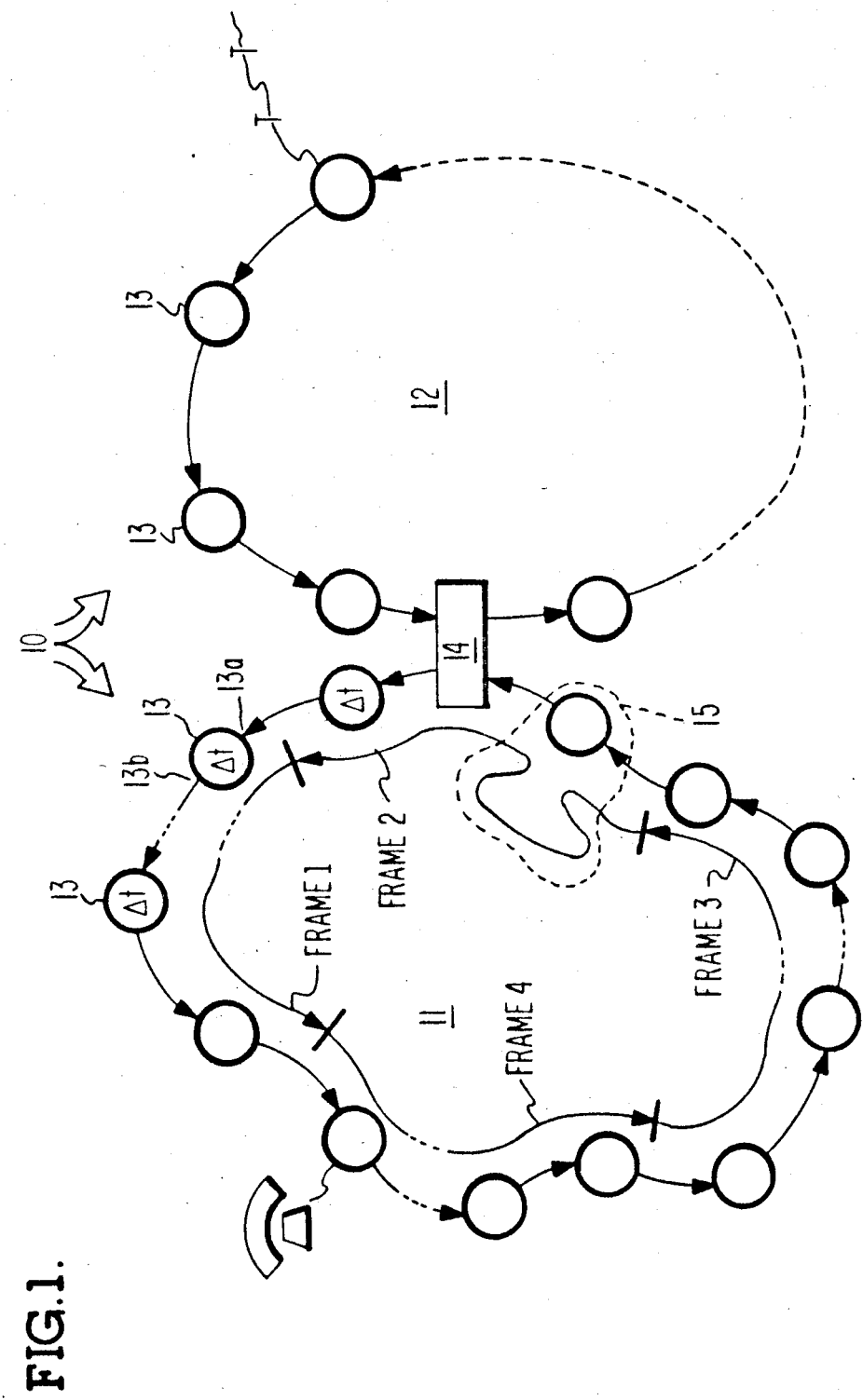
FIG. 1 illustrates a local area network which incorporates the present invention.

Referring to FIG. 1, it shows a local area network 10 which includes two communication loops 11 and 12. Each of the loops 11 and 12 is made up of a plurality of stations 13, and each station has an input port 13a and an output port 13b. All of the stations of a communication loop are connected in series by a signal carrier (e.g., an optical fiber) such that the input port of one station connects to the output port of the next.

When one station on a loop transmits a message to another station on the same loop, the message from the sending station passes around the loop through all of the stations and back to the sending station. As the message passes through the station which is to receive the message, that station recognizes its own address as the destination of the message and in response it duplicates the message internally for its own use. Also, the receiving station may modify status bits to the message that passes around the loop to indicate to the sender that the message was received. Then when the message returns to the station that initially sent it, that station removes the message from the loop.

Also in the FIG. 1 local area network, a bridge 14 is provided which enables messages to pass from any station on loop 11 to any station on loop 12, and vice versa. When a station on loop 11 sends a message to a station on loop 12, the following sequence occurs. First, the message from the sending station on loop 11 passes around the loop to the bridge. There the bridge recognizes an address in the message as one that is for a station on loop 12. In response, the bridge copies the message, and it modifies the status bit in the message that passes around loop 11 to indicate it received the message. When the message returns to the station that initially sent it on loop 11, that station removes the message from the loop.

Subsequently, the bridge 14 places the message onto loop 12. Then the receiving station recognizes its address in the message, so it duplicates the message. Again, as the message passes through the receiving station, status bits indicating its receipt may be modified. Then when the message is received by the bridge, the bridge removes the message from loop 12.

In order to send messages around the loops 11 and 12 as described above, each of the stations must temporarily store a portion of the message as it passes through the station. In other words, each of the stations delay the message as it passes around the loop by a certain amount $\Delta t$. This delay is needed so that the station can recognize whether the message is addressed to it, or whether the message was sent by it. Also, a certain amount of logic is required in each station to make the above described decisions. With the present invention, the delay which each station introduces and the logic circuitry in each station is substantially reduced.

Figure 2:
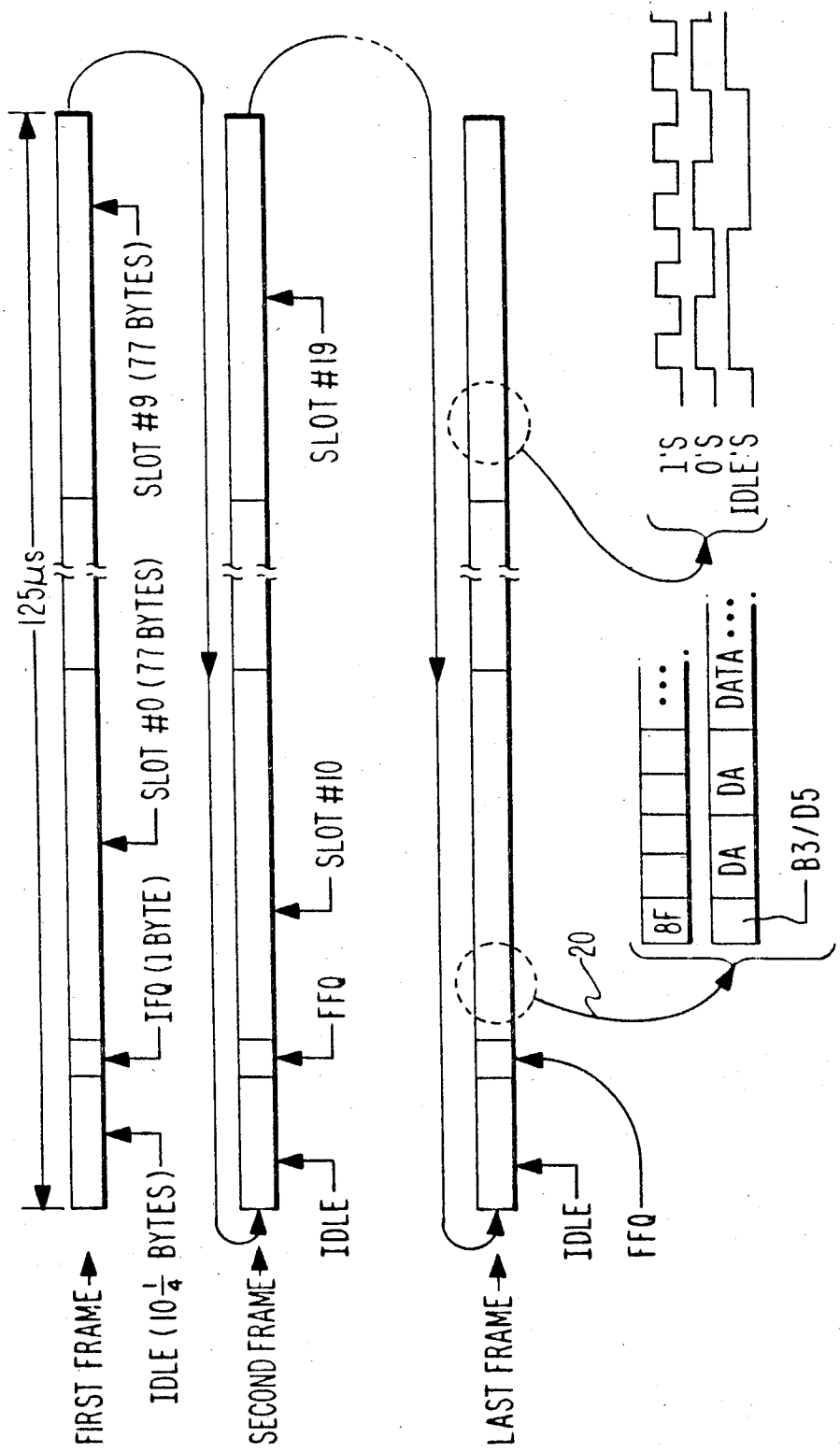
FIG. 2 illustrates the format by which isochronous and nonisochronous data are circulated on the network of FIG. 1.

To show how this is achieved, reference should now be made to FIG. 2 which illustrates the format by which messages are passed around the loops 11 and 12. This format consists of a plurality of frames which are labeled Frame 0, Frame 1, etc. Each frame consists of the same predetermined number of bytes. This number is chosen such that it, divided by the rate at which bytes are sent on the loop, equals 125 microseconds. Thus, every station on a loop will receive one complete frame on its input port every 125 microseconds.

As a particular example, suppose bits are received on the input port of each station at the rate of 50 megabits per second. Then the number of bytes in each frame is 125 microseconds times 50 megabits per second divided by eight which equals $781\frac{1}{4}$. All these bytes are allocated within each frame as illustrated in FIG. 2.

The first $10\frac{1}{4}$ bytes of each frame are idle characters. Then the next byte of the very first frame is an index frame qualifier (IFQ); whereas the next byte of the remaining frames is a following frame qualifier (FFQ). Following each IFQ and FFQ byte are ten slots which consist of 77 bytes each.

Reference numeral 20 in FIG. 2 indicates how the bytes within each slot are allocated. The first byte is a control byte CTL which contains control information. A hexadecimal code of B3 indicates that the slot is empty and may be used by any station to send a nonisochronous message. A hexadecimal code of D5 indicates that the slot is full and contains a nonisochronous message. And a hexadecimal code of 8F indicates that the slot contains isochronous data channels.

If the slot carries a nonisochronous message, then the next two bytes after the control byte contain the destination address (DA) of the message. That is, DA is the address of the station that is to receive the message. Then, the next two bytes after the DA address contain the address of the station that originated the message (the source address SA). All the remaining bytes in the slot contain the actual nonisochronous message plus any status bits and error check bits that may be desired.

On the other hand, if the slot carries isochronous data (that is, if the control byte is 8F), then each byte after the control byte is one byte of a separate independent channel of isochronous data. One station can transmit a byte of isochronous data in channel 0 of every frame, another station can transmit a byte of isochronous data in channel 1 of every frame, etc.

Which channel a particular station is allocated is accomplished by designating one of the stations on the loop a master controller. Then a station which wants to send isochronous data requests a channel by sending a nonisochronous message to the master controller. In response, the master controller sends a nonisochronous message to the requester indicating which channel it may use. Subsequently, after the requester is finished with the use of the isochronous channel, it sends a nonisochronous message to the master controller indicating that the channel can be reassigned to another station.

Reference numeral 21 indicates a preferred encoding for the bytes within the frames as they are sent around the loop from one station to the next. A logical one bit is a high frequency for one period; a logical zero bit is half the one bit frequency; and an idle is a quarter of the one bit frequency. Thus, the idle is a unique waveform which is not made up of the one and zero frequencies and which does not occur anywhere during the frame except at the beginning.

With the above encoding, the IFQ byte is defined as the first byte that follows immediately after a sequence of idles provided that byte has a particular pre-assigned bit pattern. Similarly, the FFQ byte is defined as the very first byte that follows immediately after the sequence of idles provided it has another pre-assigned bit pattern. Preferably, the particular bit patterns that are used for the IFQ and FFQ byte are substantially different from each other so that they can be distinguished even if some of the bits get inverted. Suitably, an FFQ is a hexidecimal 25 and an IFQ is a hexidecimal 19.

Now the number of frames that occur on a particular loop depends upon the total delay around the loop. This in turn depends on the number of stations on the loop, the number of bytes which each station temporarily stores between its input and output ports, and the cable delay between stations. Suppose, for example, that there are 1,000 stations on loop 11, that each station temporarily stores three bytes between its input and output ports, and that cable delay is insignificant. Thus a total of 3,000 bytes are stored in the loop. Each frame in FIG. 2 consists of 781 bytes, and so a total of four frames will circulate the loop.

Actually, at any one time instant, only three full frames and a fraction of the fourth frame will be on the loop. This is because the loop only stores 3,000 bytes. To store the remaining bytes, one station must include additional delay to hold all the bytes which the loop cannot otherwise accommodate. This is indicated in FIG. 1 wherein frames 1, 4, and 3 are shown as being completely on the loop, and frame 2 is indicated at reference numeral 15 as being partially on the loop and partially stored temporarily in one of the stations 13. Preferably, this station is the master station which initially formats the network by sending out the IFQ and FFQ bytes at periodic time intervals.

Figure 3:
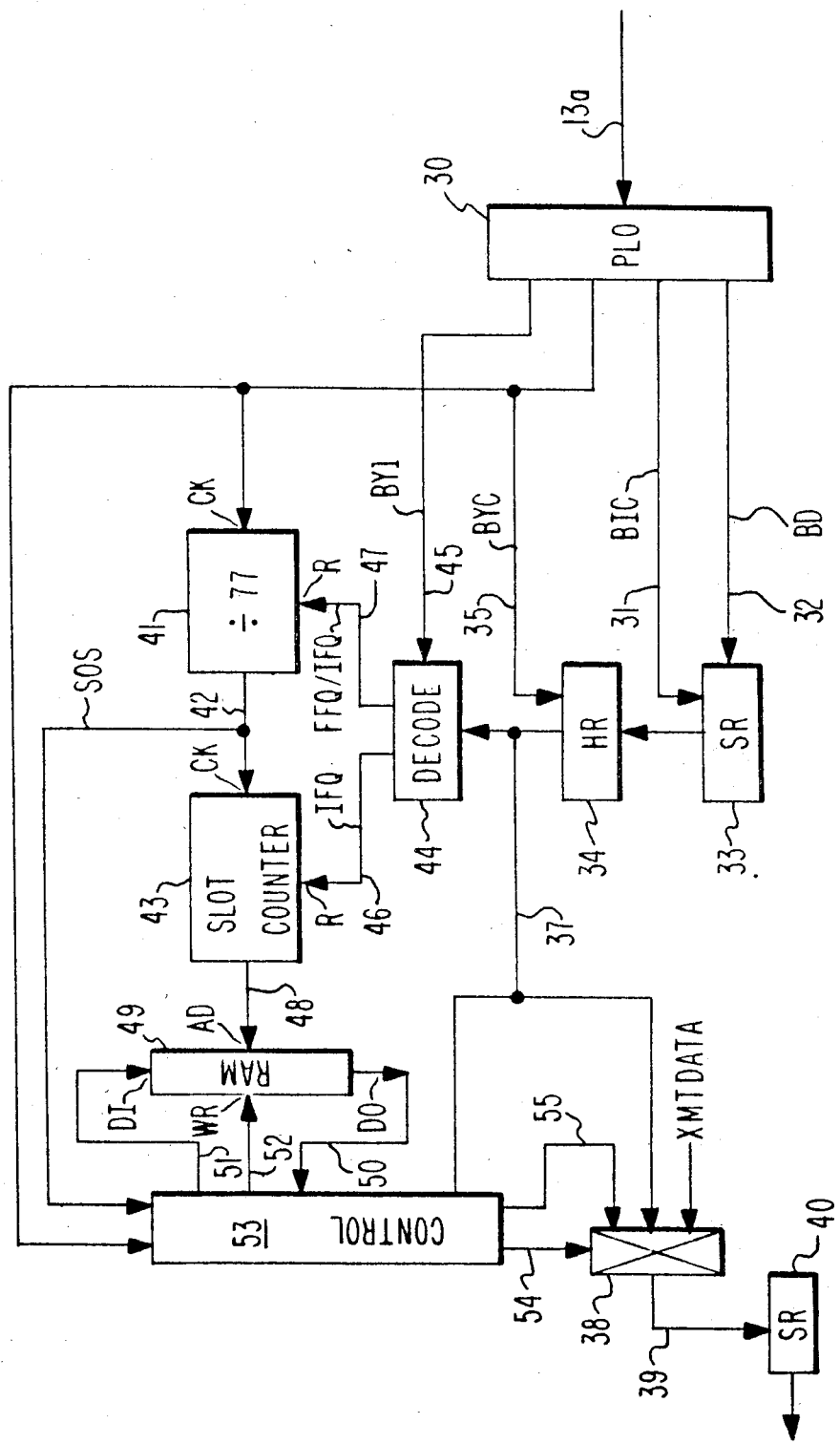
FIG. 3 illustrates a station on the network of FIG. 1 which transmits and receives isochronous and non-isochronous data via the FIG. 2 format.

Referring now to FIG. 3, the makeup and internal operation of a typical station 13 will be described. Frequency encoded data is received on the station's input port 13a whereupon it passes to a phase locked oscillator (PLO) 30. Oscillator 30 generates a bit clock (BIC) from the frequency encoded data, and it also converts that frequency encoded data to binary data (BD) where a high voltage is a one and a low voltage is a zero.

Bit clock BIC and binary data BD are respectively sent on conductors 31 and 32 to a serial-parallel shift register 33 whereupon the bits are accumulated into bytes. After a byte has accumulated, it is transferred to a holding register (HR) 34. This transfer occurs in response to a byte clock (BYC) that is generated by oscillator 30 on a conductor 35. Byte clocks are not generated when idle characters are being received. The first byte clock occurs after the first eight binary data bits BD pass into shift register 33; the next byte clock occurs eight bit times later; etc.

From holding register 34, the data is sent on conductors 37 to a multiplexer 38; and from the multiplexer data passes over conductors 39 to a parallel-serial shift register 40. From there, data is frequency encoded and sent to output port 13b. Thus, the path formed by components 32, 33, 34, 37, 38, 39, and 40 is that which signals follow between the input and output port when the station is in a quiescent state.

Also included in the FIG. 3 station is a counter 41. It has a clock input CK which is coupled to conductor 35 to receive the byte clock BVC. In operation, counter 41 divides the BYC signal by seventy-seven; and it sends a start of slot signal (SOS) on a conductor 42 each time seventy-seven byte clock signals have been received.

Conductor 42 couples to the clock input of another counter 43. This counter is incremented by one each time a new slot begins to pass through the station. Thus, counter 43 contains a count of zero when slot 0 is passing through the station, contains the count of one when slot 1 is passing through the station, etc. Signal SOS is sent to increment counter 43 since it pulses at the start of each new slot.

To initialize counters 41 and 43, a decoder 44 is provided. It receives the holding register signals on the conductors 37; and it also receives a signal BY1 on a conductor 45 from the PLO which indicates when the very first byte of a frame is in the holding register. If the bit pattern in the holding register equals an IFQ when signal BY1 occurs, then the decoder sends a reset pulse on a conductor 46 to the reset terminal R of counter 43. And, if the decoder detects either an IFQ or an FFQ in the holding register when signal BY1 occurs, it sends a reset pulse on a conductor 47 to the reset terminal R of counter 41.

The count in counter 43 is sent on conductors 48 to the address inputs AD of a random access memory (RAM) 49. This RAM contains respective one bit words for each slot on the loop. Data that is read (DO) from the RAM is sent on a conductor 50; data that is written (DI) into the RAM is sent on a conductor 51, and a write pulse (WR) is sent on a conductor 52. These conductors couple to a control circuit 53. Suitably, circuit 53 is a microprocessor.

Other signals that controller 53 receives are the byte clock BYC on conductor 35, the start of slot signal (SOS) on conductor 42, and the holding register contents on conductors 37. These signals are utilized as follows to transmit data onto and receive data from the communication loop.

At the start of each transmit operation, controller 53 first monitors signal SOS. When it occurs, controller 53 examines the contents of holding register 34. If the holding register contains the empty code (83) and the station has nonisochronous data to send, then it changes the empty code to a full code (D5) by sending a D5 on conductors 55 and directing multiplexer 38 to pass those signals for one byte time. Then controller 53 sends a signal on conductor 54 which directs a multiplexer 38 to pass the data that is to be transmitted (XMTDATA).

Also, controller 53 writes a binary one into memory 49 at the address that is contained in counter 43 by putting in one on conductor 51 and pulsing conductor 52. Thereafter the XMTDATA continues to be sent until controller 53 receives the next SOS signal whereupon controller 53 stops transmitting data by sending a signal on conductor 54 which causes multiplexer 38 to pass signals from the holding register.

Thereafter, controller 53 examines the contents of holding register 34 on the receipt of each signal SOS. At that time, if holding register 34 contains a full signal (D5), then controller 53 examines the data that is being read from RAM 49 at the address in counter 43. If the DO data is a one, then the slot which is currently passing through the station is full because the station previously wrote nonisochronous data into it. Thus, controller 53 marks the frame as empty by generating an empty code (83) on conductors 55 and passing it through the multiplexer 38 for one byte clock time, and thereafter passing the content of holding register 34 through the multiplexer. Also, controller 53 writes a zero bit in RAM 49 at the address in counter 43.

To receive a nonisochronous message, controller 53 examines the content of holding register 34 upon the receipt of each SOS signal to determine if it contains the full code (D5). If it does, then controller 53 examines the content of holding register 34 on the next two byte clocks BYC to determine if the destination address DA equals the station's address. If the DA and station address match, controller 53 copies the content of holding register 34 on each byte clock BYC until the next SOS signal is received.

Next, suppose the station has isochronous data to send. In that case, controller 53 examines the content of holding register 34 on the receipt of the SOS signal to determine if the holding register contains the isochronous control code (8F). If it does, then controller 53 counts the byte clock each time it is received until the channel which the station was previously assigned is reached. When that occurs, controller 53 sends a signal on conductor 54 which causes the multiplexer 38 to pass the XMTDATA for one byte time after which the content of holding register 34 is again passed through the multiplexer. Similarly, if the station had isochronous data to read, controller 53 stores the contents of the holding register when the byte counter indicates that the holding register contains the pre-assigned channel.

One feature of the above described network is that each station introduces only a very small delay between its input and output ports. Other than the delay caused by the serial-parallel shift register 33 and parallel-serial shift register 40, the delay between the input and output ports is only one byte time as caused by holding register 34.

Substantially more delay would be required if each station that initiated the transmission of a nonisochronous message had to compare the source address of the messages on its put port in order to determine when that message traveled all the way around the loop so it could then change the slot control code from full to empty. In particular, the slot control code, the source address (SA) and all bytes between them (e.g., the destination address bytes (DA) would have to be stored in delay in the station between the input and output ports.

But the FIG. 3 station does not compare the source address of a message to determine if it sent the message. Instead, counters 41, 43 and the RAM 49 signal the return of a transmitted message. These components are able to signal the return of a transmitted message because the first frame on the transmission network is distinguishable from the following frames. Specifically, the IFQ byte is different than the FFQ byte.

Another feature of the above described network is that only a small amount of circuitry is required in a bridge circuit to change a slot from full to empty. Recall that a bridge receives messages from any station on one loop and transmits them on the other loop with the source address bytes (SA) containing the address of the station that originated the message. Thus, a bridge which uses an address compare approach to determine when it receives a message that it transmitted will require one address holding register and one comparator for each message that it can have on the network at the same time. But in the above described network, the bridge station merely has components 41, 43, and 53 to detect when it receives a message that it transmitted.

Still another feature of the disclosed network is that the method which it uses to change a slot from full to empty is very reliable. As was pointed out above, the IFQ and FFQ bytes are detectable even if some of their bits get inverted. These bytes are the only ones that affect the operation of circuit components 41, 43 and 49. Thus, those components will correctly signal when a message travels around a loop and back to the original transmitter of the message even when bits are inverted during transmission. By comparison, an address compare circuit clearly will not detect the return of a transmitted message if bits in the source address are inverted during transmission.

Another feature of the disclosed network is that the counter 43 in each station which keeps track of the slots get reinitialized on each passage of the IFQ byte. Thus, if a transient error occurs in the counter due to noise, that error will be eliminated when the next IFQ byte is received and the counter is resynchronized.

Another feature of the disclosed network is that any number of frames can be added to or deleted from the network without altering the operation of the remaining stations. When frames are added, counter 43 simply counts up to a larger number; and when frames are deleted, counter 43 simply counts up to a smaller number. Frames may be added and deleted when stations are added and deleted to the network.

Yet another feature of the disclosed network is that the master station 15 that initially transmits the IFQ and FFQ bytes does not have to know the number of stations on the network before its transmissions begin. It merely transmits an IFQ byte; and then it transmits an FFQ byte each 125 microseconds until the IFQ byte is returned. Then it adjusts its internal delay such that the FFQ is retransmitted 125 microseconds after the last FFQ.

Preferably, the master station stores internally to itself the total number of frames that are on the network. This it does by counting all frames that it transmits after the first IFQ until the first IFQ is returned. Then, after the count is stored, the master station counts frames by counting the BY1 signal; and after the total number of frames have been received, the master absorbs the IFQ byte that it previously transmitted and regenerates a new one.

A preferred local area network and method of operating the same in accordance with the invention has now been described in detail. In addition, however, many changes and modifications can be made to these details without departing from the nature and spirit of the invention. For example, all of the slots of FIG. 2 may be used to carry nonisochronous data; in which case, a station can still use the IFQ byte in conjunction with its counters 41 and 43 to determine when to remove data that it previously transmitted. Accordingly, the invention is not to be limited to these details but is defined by the appended claims.

I claim:

1. A method of simultaneously transmitting both isochronous and nonisochronous data on a communication network of the type that includes a plurality of stations having respective input and output ports that are serially intercoupled in a loop; said method including the steps of:
   circulating around said loop, a single occurrence of a first unique signal pattern and at least one occurrence of a second unique signal pattern with a constant frame time interval between each unique signal pattern and the next one;
   counting at a fixed rate in one of said stations starting with the receipt of said first unique signal pattern;
   writing nonisochronous data onto said loop and storing a signal in said one station representative of the count when said writing occurred;
   recounting at said rate in said one station beginning with the next receipt of said first unique signal pattern;
   sending onto said loop, when the recount matches the count represented by said stored signal, a control code indicating said nonisochronous data can be removed; and simultaneous with the above steps
   writing isochronous data from another station at a predetermined time interval immediately after the receipt of each of said unique signal patterns.

2. A method according to claim 1 and further including the substeps of:
   providing, in said one station, a memory having respective storage locations for each count that occurs during said counting step;
   storing a one bit at the storage location which corresponds to the count that is reached by said counting step when said writing of nonisochronous data occurs; and,
   sequentially reading from the storage locations that correspond to each count that is reached during said recounting step, and when said one bit is read, rewriting it as a zero bit and performing said sending of said control code step.

3. A method according to claim 1 wherein:
   said writing of said nonisochronous data includes the substeps of writing a source address which identifies said one station as being the source of said nonisochronous data, writing a destination address which identifies the station that is to receive said nonisochronous data, and writing a control code indicating said nonisochronous data is present; and,
   said one station, after writing said nonisochronous data, passes the signals which it receives on its input port to its output port with a delay that is shorter than the time it took to write said destination address, source address, and control code.

4. A method according to claim 1 wherein:
   all of the steps of claim 1 are repeated multiple times; and,
   the number of occurrences of said second unique signal pattern which follow each occurrence of said first unique signal pattern is not always the same.

5. A method according to claim 1 wherein:
   said writing of said isochronous and said nonisochronous data is performed by writing respective signal sequences of only two preselected frequencies; and, said first and second unique signal patterns that circulate on said loop include a third preselected frequency.

6. A method according to claim 1 wherein:

said first unique signal pattern consists of a low frequency waveform followed immediately by a first sequence of two higher frequencies; and said second unique signal pattern consists of said low frequency waveform followed immediately by a second sequence of said two higher frequencies that differs from said first sequence at multiple locations.

7. A method according to claim 6 wherein:

said recounting step starts when the input port of said one station receives said low frequency waveform followed immediately by any sequence of said two higher frequencies that resembles said first sequence more closely than said second sequence.

8. A method according to claim 1 and further including the steps of:

initiating said first unique signal pattern from the output port of a single station on said loop each time a predetermined time interval elapses;

corrupting some of the initiated first unique signal patterns as they circulate around said loop; and, absorbing, in said single station, both the corrupted and uncorrupted first unique signal patterns after they circulate once around said loop.

9. A method according to claim 8 and further including the steps of:

sending, at a random time instant from the output port of said single station, an isolated occurrence of said first unique signal pattern;

measuring, in said single station, the time it takes said isolated occurrence of said first unique signal pattern to circulate once around said loop; and making said predetermined time interval equal to the smallest multiple of said frame time interval which is at least as large as said measured time.

10. A method of transmitting data on a communication network of the type that includes a plurality of stations having respective input and output ports that are serially intercoupled in a loop; said method including the steps of:

circulating around said loop, a single occurence of a unique signal pattern;

counting at a fixed rate in one of said stations starting with the receipt of said unique signal pattern;

writing data onto said loop and storing a signal in said one station representative of the count when said writing occurred;

recounting at said rate in said one station beginning with the next receipt of said unique signal pattern; and sending onto said loop, when the recount matches the count represented by said stored signal, a control code indicating said data can be removed.

11. A method according to claim 10 and further including the substeps of:

providing, in said one station, a memory having respective storage locations for each count that occurs during said counting step;

storing a one bit at the storage location which corresponds to the count that is reached by said counting step when said writing of data occurs; and, sequentially reading from the storage locations that correspond to each count that is reached during said recounting step, and when said one bit is read, rewriting it as a zero bit and performing said sending of said control code step.

12. A method according to claim 10 wherein:

said writing of data includes the substeps of writing a source address which identifies said one station as being the source of said data, writing a destination address which identifies the station that is to receive said data, and writing a control code indicating said data is present; and, said one station, after writing said data, passes the signals which it receives on its input port to its output port with a delay that is shorter than the time it took to write said destination address, source address, and control code.

* * * * *